(12) United States Patent
Kato et al.

(10) Patent No.: US 6,507,165 B2
(45) Date of Patent: Jan. 14, 2003

(54) CONTROLLER FOR MACHINE

(75) Inventors: Tetsuaki Kato, Hadano (JP); Toru Shirahata, Yamanashi (JP); Kaname Matsumoto, Yamanashi (JP); Hiroyuki Kawamura, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/779,496

(22) Filed: Feb. 9, 2001

(65) Prior Publication Data

US 2001/0033146 A1 Oct. 25, 2001

(30) Foreign Application Priority Data

Feb. 10, 2000 (JP) ......................... 2000-033388

(51) Int. Cl.[7] .................. G05B 6/02; G05B 19/416
(52) U.S. Cl. .................. 318/611; 318/621; 318/568.22
(58) Field of Search .............. 318/567, 568.1, 318/568.11, 568.16, 568.17, 568.18, 568.19, 568.22, 611, 621, 625

(56) References Cited

U.S. PATENT DOCUMENTS

| | | | | |
|---|---|---|---|---|
| 3,562,477 A | * | 2/1971 | Macmanus | |
| 4,195,265 A | | 3/1980 | Vali | 328/167 |
| 4,626,754 A | * | 12/1986 | Habermann et al. | 318/460 |
| 4,631,683 A | * | 12/1986 | Thomas et al. | |
| 4,943,759 A | * | 7/1990 | Sakamoto et al. | 318/568.11 |
| 5,170,358 A | | 12/1992 | Delio | 364/474 |
| 5,331,264 A | * | 7/1994 | Cheng et al. | 318/568.11 |
| 5,331,299 A | | 7/1994 | Smith | 333/175 |
| 5,594,309 A | * | 1/1997 | McConnell et al. | 318/568.22 |
| 5,627,440 A | * | 5/1997 | Yamamoto et al. | 318/568.21 |
| 5,636,287 A | * | 6/1997 | Kubli et al. | 381/71 |
| 5,637,969 A | * | 6/1997 | Kato et al. | 318/432 |
| 6,297,742 B1 | * | 10/2001 | Canada et al. | 340/635 |

FOREIGN PATENT DOCUMENTS

| | | |
|---|---|---|
| EP | 0554125 A2 | 8/1993 |
| EP | 0685779 A1 | 12/1995 |

OTHER PUBLICATIONS

Franklin et al. "Feedback Control of Dynamic Systems", 3rd Ed., Addison–Wesley Publishing Company, 1994, pp. 121–123.*

* cited by examiner

*Primary Examiner*—Bentsu Ro
(74) *Attorney, Agent, or Firm*—Staas & Halsey LLP

(57) ABSTRACT

A controller for a machine such as a robot and a machine tool having an electric motor as a driving source of the machine, capable of suppressing a natural vibration of the machine and/or an attachment attached to the machine. A frequency or a cycle of the natural vibration of an end effector of the robot as the attachment or the machine itself is determined and a coefficient of a filter for suppressing an amplitude of the natural vibration is altered in accordance with the measured frequency or cycle of the natural vibration. In the case of suppressing a natural vibration of the end effector attached to the robot, frequencies or cycles of natural vibrations of various end effectors in accordance with an operation status of the end effector are determined and stored, and the coefficient of the filter is set in accordance with the stored frequency or cycle of the natural vibration in accordance with the end effector attached to the robot and the operation status. In the case of suppressing a natural vibration of the machine, the natural frequency of the machine is always detected and the coefficient of the filter is automatically altered in accordance with the detected natural frequency, to thereby suppressing an amplitude of the natural vibration of the machine having the natural frequency varying due to variation of load and aging of the machine.

27 Claims, 11 Drawing Sheets

CONTROLLER FOR MACHINE

BACKGROUND OF THE INVENTION

1. Field of the Invention

The present invention relates to a controller for an industrial machine such as a robot, a machine tool and a manufacturing machine, having an electric motor as a driving source of the machine, and in particular to a controller capable of preventing a vibration of a controlled system such as the machine, an attachment of the machine and the machine with the attachment.

2. Description of the Related Art

In the controller for a robot, there have been developed various acceleration/deceleration control methods for obtaining an optimum acceleration/deceleration motion of the robot so that mechanism of the robot do not vibrate. According to these method, an acceleration/deceleration control suitable for the robot mechanism and capabilities of electric motors for driving the robot mechanism is performed to enable a high speed robot motion in operating the robot without an end effector attached to the robot.

In the controller for a machine tool, a band rejection filter is used for suppressing sympathetic vibration between the electric motor and the mechanism driven by the electric motor.

With the above method, there arises no problem in a case where an end effector attached to the robot is relatively small or a workpiece held by a hand as the end effector is relatively small. However, in recent years, as shown in FIG. 6, a root system with a large hand 2 attached to the robot 1 for handling a relatively light but bulky workpiece (e.g., a press machined product such as a vehicle body or door) has been increased. Such large hand and the workpiece to be handled with such large hand have low rigidity compared with the robot mechanism. Thus, the hand and the workpiece held by the hand may vibrate when the robot is operated with high speed although the robot mechanism is controlled not to vibrate. With this vibration, there arises problems that the hand fails to hold a workpiece at the predetermined position or the hand drops the workpiece in handling the workpiece. Thus, there is a case where the robot can not operate at the taught speed with a hand attached or the hand holding a workpiece although the robot itself can operate at the taught speed.

At present, the operation speed of the robot is adjusted on a try-and-error basis so that the hand and the workpiece held by the hand do not vibrate in a trial operation of the robot which is requires a time consuming. Further, a workpiece and a peripherical device may be damaged if the hand drops the workpiece or collides with the peripherical device due to the vibration of the hand and the workpiece in the trial operation of the robot. Such trial operation loads an operator with a heavy and time consuming burden.

SUMMARY OF THE INVENTION

The present invention provides a controller for a machine having an electric motor as a driving source of the machine, and the controller comprises: natural frequency determining means for determining a frequency or a cycle of a natural vibration of the machine and/or an attachment attached to the machine as a controlled sytem; and motion command generating means for generating a motion command for the electric motor such that the natural vibration of the machine and/or the attachment is suppressed in accordance with the frequency or the cycle of the natural vibration determined by the natural frequency determining means.

The natural frequency determining means may comprise a frequency analyzer for analyzing a vibration frequency of a control signal for the electric motor to determine the frequency or the cycle of the natural vibration, and said motion command generating means has a filter for reducing an amplitude of the natural vibration and automatically alters a coefficient of the filter in accordance with the frequency or the cycle of the natural vibration determined by the frequency analyzer. The frequency analyzer analyzes the control signal regarding a torque, a velocity or a position of the electric motor.

In the case where the controller controls a robot with an end effector attached thereto as the attachment, the motion command generating means has an acceleration/deceleration processing section for creating an acceleration/deceleration motion command for operating the robot in accordance with the frequency or the cycle of the natural vibration of the end effector such that the natural vibration of the end effector is suppressed.

A parameter of the acceleration/deceleration processing section is altered based on the frequency or cycle of the natural vibration of the end effector.

The acceleration/deceleration processing section may comprise first and second filers connected in series for performing linear acceleration/deceleration processing, and a filter length of the second filter is determined based on the frequency or the cycle of the natural vibration.

The acceleration/deceleration processing section may comprise an exponential function filter having a low-pass filter, and a cutoff frequency of the exponential function filter is determined based on the frequency or cycle of the natural vibration.

The acceleration/deceleration processing section may comprise a band rejection filter for rejecting a predetermined band including the frequency of the natural vibration.

The end effector may be a hand, a gun or a torch. In the case where different kinds of end effectors are used, the natural frequency determining means stores data of frequencies or cycles of the natural vibrations of the different kinds of end effectors, and date of frequencies or cycles of the natural vibrations is selected in said data in accordance with a kind of the end effector attached to the robot.

In the case where a hand is used as the end effector, the natural frequency determining means determines the frequencies or cycles of the natural vibrations of the hand holding a workpiece and holding no workpiece, and the acceleration/deceleration processing section creates the acceleration/deceleration motion command such that the natural vibration of the hand with or without the workpiece is suppressed in accordance with holding status of the hand and the frequencies or the cycles of the natural vibrations determined by said natural frequency determining means.

In the case where the hand handles a different kind of workpiece, the natural frequency determining means stores data of each frequency or cycle of the natural vibration of the hand holding the different kind of workpiece and data of frequency or cycle of the natural vibration of the hand is selected in said data in accordance with a kind of workpiece held by the hand. Further, the natural frequency determining means may store data of frequencies or cycles of the natural vibrations of the hand without holding any workpiece and holding a different kind of workpiece, and data of frequency or cycle of the natural vibration of the hand is selected in said data in accordance with holding status of the hand and a kind of workpiece held by the hand.

A degree of suppression of the natural vibration can be variably set. The frequency or cycle of the natural vibration may be determined by a measuring device or based on a torque or a velocity of the electric motor in the robot when an external force is applied to the end effector.

DETAILED DESCRIPTION OF THE PREFERRED EMBODIMENTS

Figure 1:
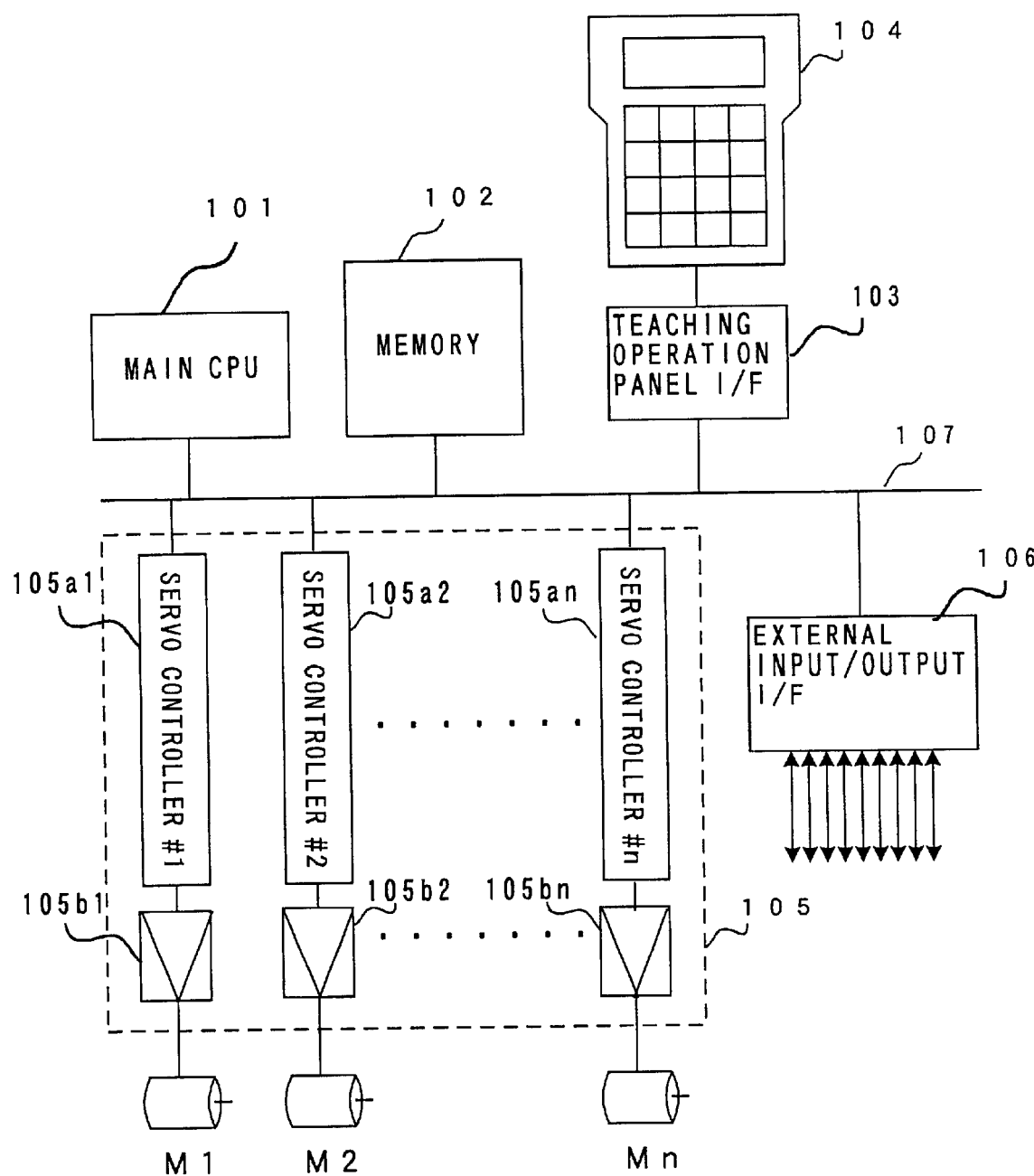
FIG. 1 is a block diagram showing schematic configuration of a robot controller according to the present invention.

FIG. 1 is a schematic block diagram of a principal part of a controller for a robot according to the present invention. A main processor 101, a memory 102 composed of a RAM, a ROM and a nonvolatile memory (such as an EEPROM), an interface 103 for a teaching operation panel 104, an interface 106 for external devices, and a servo control section 105 are connected to a bus 107. To the interface 103 for a teaching operation panel is connected a teaching operation panel 104.

A system program for supporting basic functions of the robot and robot controller is stored in the ROM of the memory 102. Robot operation programs and their related set data which are taught in accordance with applications are stored in the nonvolatile memory of the memory 102. Particularly according to the present invention, a natural frequency Frq(n) associated with a schedule number fn for each status of an end effector (hand) is stored in the nonvolatile memory. The RAM of the memory 102 is used as a memory for temporary storage of data for various arithmetic operations performed by the processor 101.

The servo control section 105 comprises servo controllers 105a1 to 105an (n: sum of the number of all the axes of the robot including movable axes of an end effector attached to a wrist of the robot) each composed of a processor, a ROM, a RAM and the like. Each servo controller performs position/velocity loop control and current loop control of its associated servomotor for driving an axis. It is a so-called digital servo controller which performs loop controls of position, velocity and current by software. Each servomotor M1–Mn for driving each associated axis is drivingly controlled in accordance with the output of its associated servo controller 105a1–105an through its associated servo amplifier 105b1–105bn. Although not shown in FIG. 1, a position/velocity detector is attached to each servomotor M1–Mn, and the position and velocity of each servomotor detected by its associated position/velocity detector is fed back to its associated servo controller 105a1–105an. Sensors provided in the robot and actuators and sensors provided in the peripheral devices are connected to the input/output interface 106.

The above basic structure of the robot controller is in no way different from that of a conventional robot controller. According to one aspect of the present invention, the controller controls an acceleration/deceleration motion of the robot such that the end effector does not vibrate in an operation of the robot in accordance with a kind of the end effector attached to the robot and also an operation status of the end effector e.g. workpiece holding or not holding status of the hand, and further in accordance with a kind of workpiece held by the hand, in conformity with an operation to be performed by a robot.

Figure 6:
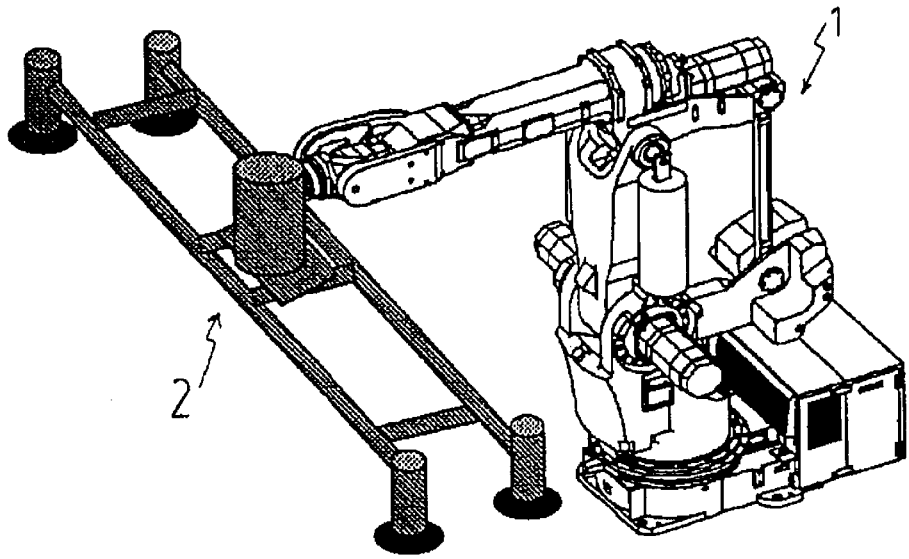
FIG. 6 is a perspective view of a robot with a large end effector to which the present invention is applied.

As shown in FIG. 6, in the case of handling the bulky workpiece such as a body or a door of a vehicle (not shown) with the large hand 2, which is attached to a wrist at an distal end of an arm of the robot 1 as an end effector, for holding the workpiece by vacuum sucking, a vibration of the large hand 2 may be generated when the robot 1 is operated. If the vibration of the hand 2 is generated, the workpiece can not be hold by the vacuum sucking of the hand so that the robot operation has to be suspended until the vibration ceases, to lower the operation efficiency.

Further, in the operation of the robot 1 with the hand 2 holding the workpiece, if the vibration of the hand 2 or the workpiece is generated, the hand 2 may drop the workpiece. According to the present invention, the robot operation is controlled taking account of frequencies or cycles of natural vibrations of the hand itself and the hand holding a workpiece. In the case where the hand handles workpieces of different kinds, a frequency or a cycle of a natural vibration of the hand holding a different kind of workpiece is taken into consideration.

In order to achieve such control, the natural frequencies of the end effector itself and the end effector with a workpiece are measured and stored in the memory 102 of the robot controller in advance.

Figure 7:
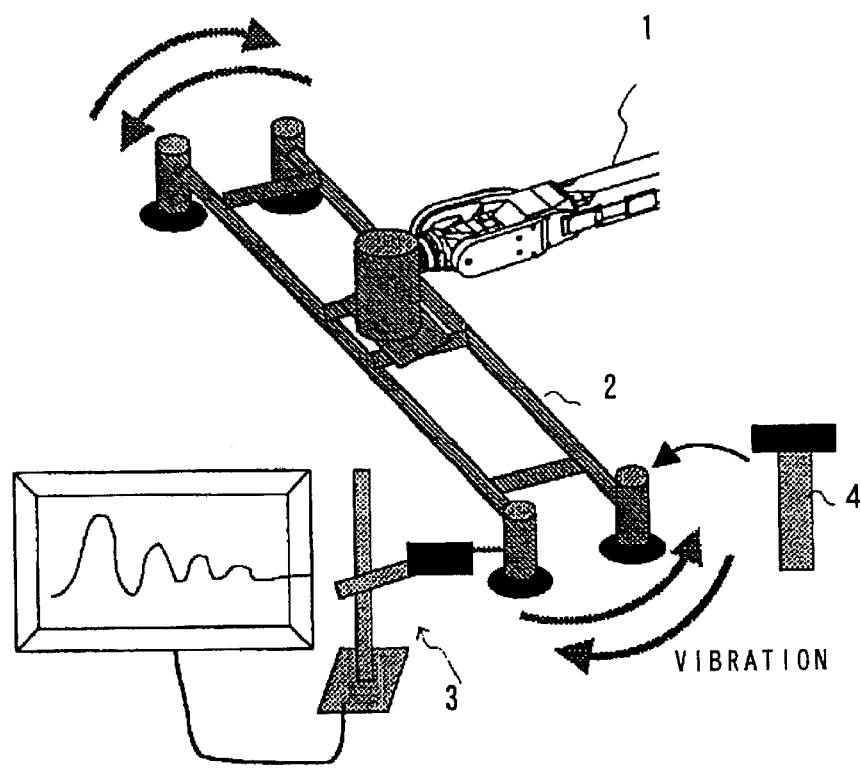
FIG. 7 is a schematic view showing how to measure a natural vibration of the end effector.

FIG. 7 shows an example of measurement of a natural frequency Frq of the hand 2 of the robot 1 as shown in FIG. 6.

First, the robot 1 is operated to have a predetermined position/posture suitable for measurement by means of a measuring device such as a laser displacement meter, and the hand 2 is hit by a hammer 4 to generate vibration. In this illustrated example a laser displacement meter 3 is employed as the measuring device. If the frequency of the vibration is changed according to position of hitting, the measurement is performed at a plurality of hitting positions and the minimum value of the measured values is determined as the natural frequency Frq.

Alternately, the natural frequency Frq or the cycle of the natural vibration may be determined based on a torque or a velocity of the motor for driving a wrist axis of the robot 1 without using the measuring device.

When the end effector attached to the robot wrist vibrates, a torque or a velocity of the motor for driving the wrist axis varies periodically with the vibration of the end effector. By measuring a frequency or a cycle of the periodical variation of the torque and the velocity of the motor, the frequency of the cycle of the natural vibration can be determined without any external measuring device.

The following description will be made on an example of determining the cycle of the natural vibration and thus the natural frequency using a disturbance estimating observer provided for the motor.

Figure 8:
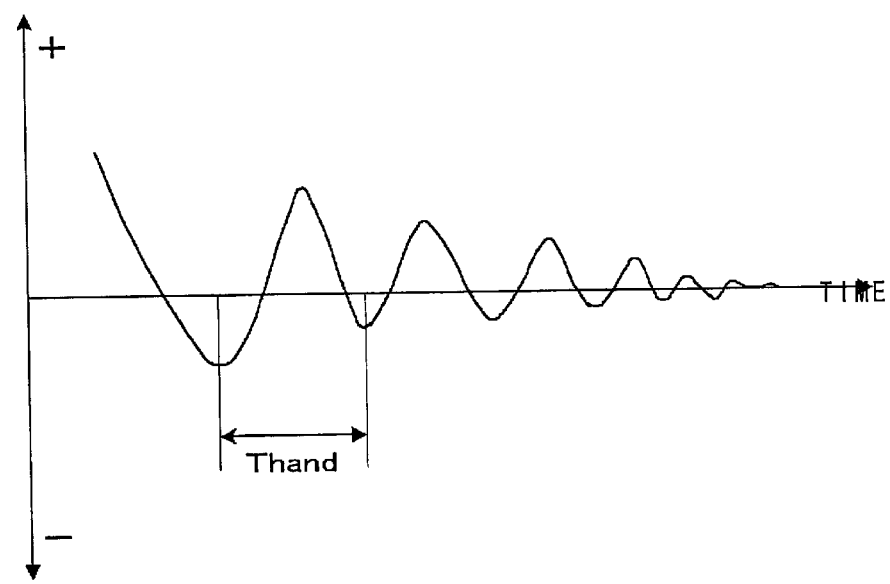
FIG. 8 is a graph of disturbance torque curve of a motor for driving a wrist axis when the end effector is hit by a hammer.

First, the end effector attached to the robot is hit by the hummer to vibrate the end effector. FIG. 8 shows an example of a variation pattern of the disturbance torque of the motor for driving the wrist axis. As shown in FIG. 8, a cycle $T_{hand}$ of the natural vibration can be determined by measuring a time period between adjacent peaks (local maximums) or adjacent bottoms (local minimums) of the disturbance torque. The motor of which the disturbance torque is estimated is selected in the motors for driving the wrist axes and the posture of the robot is determined and fixed in advance so that a direction of the vibration of the end effector is consistent with a rotational direction of the axis driven by the selected motor. Alternatively, disturbance torques of all of the motors for driving the wrist axes are estimated and the motor for an axis having the most large variation of the disturbance torque may be selected. Thus, the disturbance torque of the selected motor is estimated by the disturbance torque estimating observer provided for the selected motor, and the cycle $T_{hand}$ of the natural vibration is calculated based on the estimated disturbance torque.

Specifically, after the robot is held to have at the predetermined posture, the end effector is hit by a hammer and a natural frequency calculation software stored in the memory 102 of the robot controller is started by a signal from the teaching operation panel 104 or an external signal so that the main processor 101 executes a natural frequency calculation program.

Figure 9:
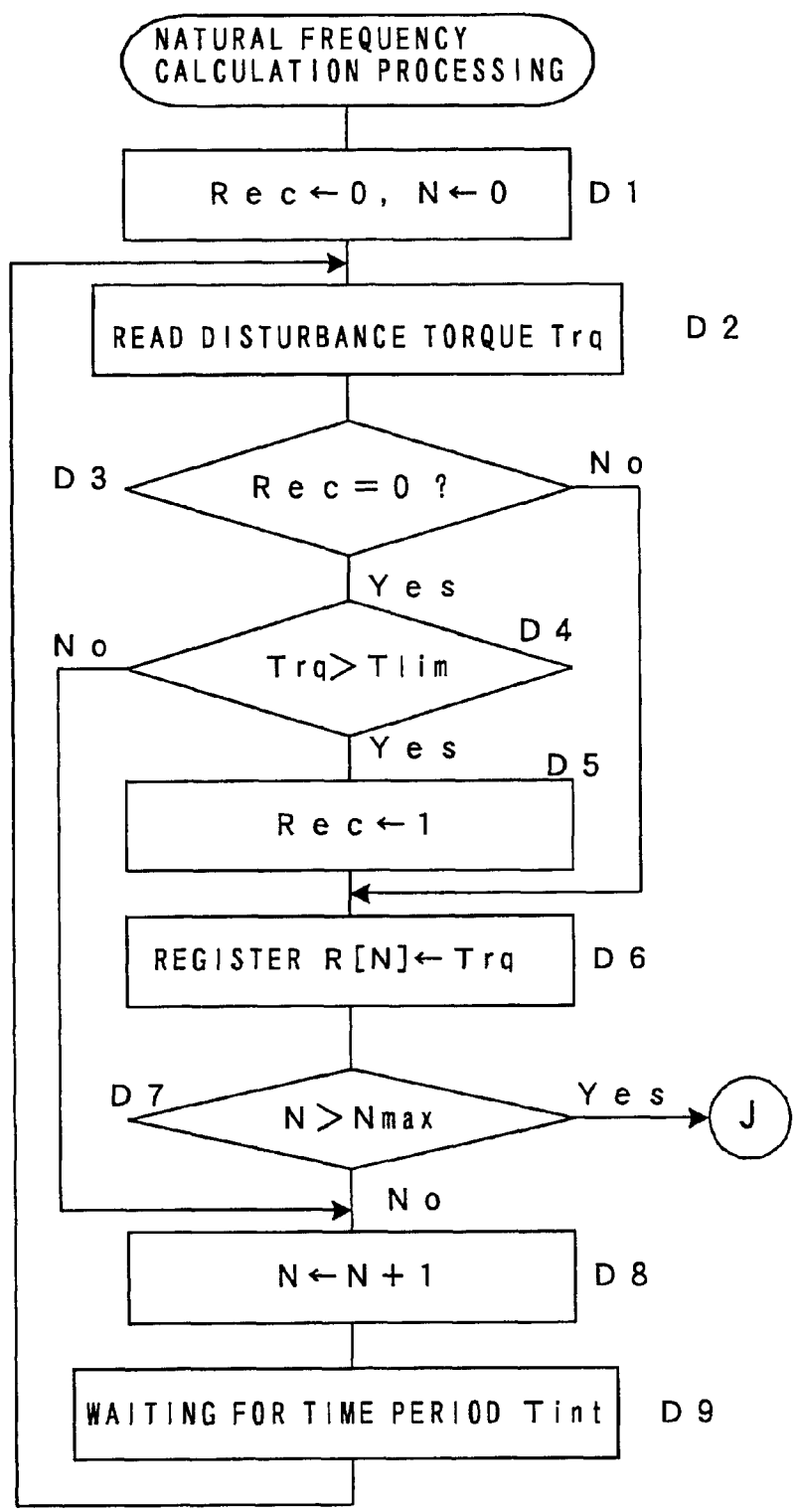
FIG. 9 is a flowchart of processing for determining the natural frequency of the end effector based on a disturbance torque applied to the motor for driving the wrist axis.
Figure 10:
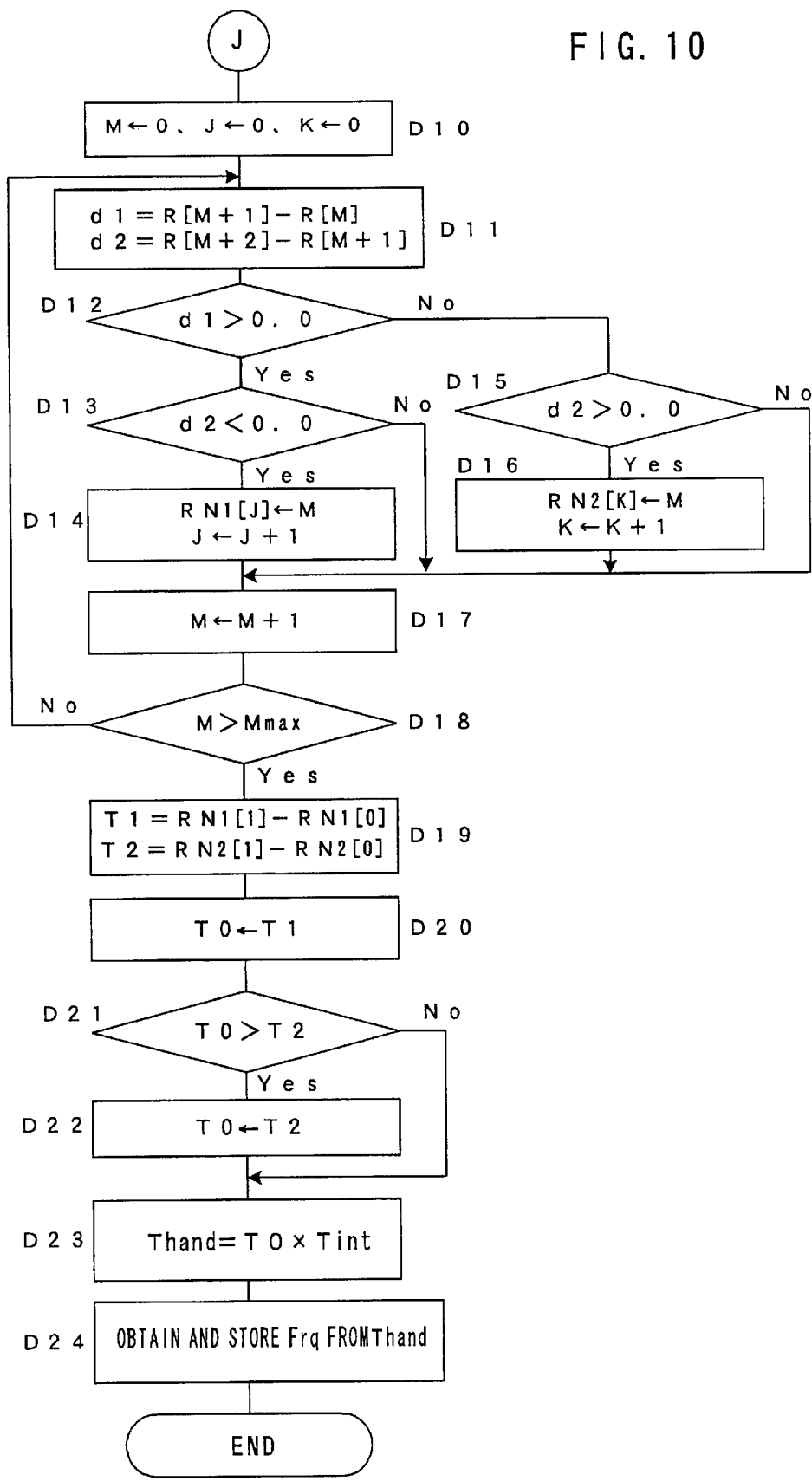
FIG. 10 is continuation of the flowchart of FIG. 9.

The main processor 101 starts execution of the natural frequency calculation processing as shown in FIGS. 9 and 10 upon receiving a command for executing the natural frequency calculation software.

First, variables Rec and N are initialized (Step D1) and the disturbance torque Trq estimated by the disturbance torque estimating observer for the wrist axis motor is read (Step D2). Then, it is determined whether the variable Rec is "0" or not (Step D3), and the procedure proceeds to Step D6 if the variable Rec is not "0". If the variable Rec is "0" (initially Rec is set to "0" in Step D1), the read disturbance torque Trq is compared with a predetermined disturbance threshold Tlim (Step D4) and if the read disturbance torque Trq does not exceed the threshold Tlim, the procedure proceeds to Step D8 where the variable N is incremented by "1". After waiting for elapse of a predetermined time period Tint (Step D9), the procedure returns to Step D2 to repeat Step D2 and the subsequent Steps. The disturbance threshold value Tlim defines a trigger of starting storage processing of history of the torque variation, and is set to a sufficiently low value relative to the disturbance torque due to the vibration of the end effector. The waiting time Tint defines a cycle of reading the disturbance torque and is set to an appropriately low value relative to the cycle of the natural vibration of the end effector.

If it is determined that the read disturbance torque Trq exceeds the threshold value Tlim in Step D4, the variable Rec is set to "1" (Step D5), and the read disturbance torque Trq is stored in a register R[N] (Step D6). Then, it is determined whether or not the variable N exceeds a maximum storage number Nmax (Step D7). If the variable N is determined not to exceed the maximum storage number Nmax, the variable N is incremented by "1" and after waiting elapse of the waiting time Tint, the procedure proceeds to Step D2 to perform the processing of Step D2 and the subsequent Steps. Since the variable Rec is set to "1" in Step D5, the procedure proceeds from Step D3 to Step D6 where the disturbance torque Trq read in the present sampling period is stored in the register R[N]. Then, it is determined whether or not the variable N exceeds the maximum storage number Nmax in Step D7. If the variable N does not exceed the maximum storage number Nmax, the variable N in incremented by "1" and after waiting elapse of the waiting time Tint, the procedure returns to Step D2. Subsequently, the processing of Steps D6, D7, D8 and D9 is repeatedly executed until the variable N exceeds the maximum storage number Nmax, to store the history of torque variation in the register R[N].

If it is determined that the variable N exceeds the maximum storage number Nmax, the torque history storage processing is terminated and the procedure proceeds to Step D10, shown in FIG. 10. The variables M, J and K are set to "0" in Step D10 and a difference d1 between the disturbance torque stored at (M+1)th sampling period and the disturbance torque stored at M-th sampling period, and a difference d2 between the disturbance torque stored at (M+2)th sampling period and the disturbance torque stored at (M+1)th sampling period are calculated (Step D11).

$$d1 = R[M+1] - R[M]$$

$$d2 = R[M+2] - R[M+1]$$

Signs of the differences d1 and d2 are determined (Steps D12, D13 and D15), and if both of the differences d1 and d2 have positive values or negative values or zero, i.e., the disturbance torque is increasing or decreasing or unchanged, the procedure proceeds to Step D17 where the variable M is incremented by "1" and it is determined whether or not the variable M exceeds a maximum data number Mmax. If the variable M does not exceed the maximum data number Mmax, the procedure returns to Step D11 where subsequent differences d1 and d2 are calculated and the processing of Step D12 and the subsequent Steps is repeatedly executed.

If the difference dl has a positive value and the difference d2 has a negative value, i.e., the variation of the disturbance torque is changed from increasing to decreasing (the curve of the estimated disturbance torque shown in FIG. 8 is upwardly convex), the value of the variable M is stored in the register RN1[J] and the variable J is incremented by "1" (Step D14). If the difference d1 has a negative value and the difference d2 has a positive value, i.e., the variation of the disturbance torque is changed from decreasing to increasing (the curve of the estimated disturbance torque shown in FIG. 8 is downwardly convex), the value of the variable M is stored in the register RN2[K] and the variable K is incremented by "1" (Step D16), and the procedure proceeds to Step D17.

Thus, the register RN1[J] (RN1[0], RN1[1], RN1[2], . . . ; J=0, 1, 2, . . . ) stores the values of the variable M, which indicate sampling time when the estimated disturbance torque has local maximums. Similarly, the register RN2[K] (RN2[0], RN2[1], RN2[2], . . . ; K=0, 1, 2, . . . ) stores the values of the variable M, which indicate sampling time when the estimated disturbance torque has local minimums.

The processing of Steps D11–D18 is repeatedly executed and when the variable M exceeds the maximum data number Mmax, the value of the register RN1[0] is subtracted from the value of the register RN1[1] to obtain T1 which indicates a time period between the adjacent local maximums, and the value of the register RN2[0] is subtracted from the value of the register RN2[1] to obtain T2 which indicates a time period between the adjacent local minimums (Step D19).

$$T1 = RN1[1] - RN1[0]$$

$$T2 = RN2[1] - RN2[0]$$

Then, the value of the register T1 is stored in the register To (Step D20) and the value of the register To is compared with the value of the resister T2 (Step D21) and if the value of the resister T2 is smaller than the value of the resister T0, the value of the resister T2 is stored in the resister To (Step D22). Thus, the resister To stores the larger value of the resister T1 and the resister T2.

The value of the resister T0 is multiplied by the sampling period (waiting time) Tint to obtain a time period between the adjacent local maximums or the adjacent local minimums (Step D23). This time period means the cycle Thand of the natural vibration of the end effector. The natural frequency Frq is calculated from thus obtained cycle Thand of the natural vibration and stored (Step D24). Thus, the natural frequency of the end effector which is attached to the robot wrist is determined based on the torque exerted on the motor for driving the axis of the robot wrist, and the natural frequency calculation processing is terminated.

In the foregoing example, the natural frequency Frq of the end effector is determined based on the disturbance torque estimated by the disturbance torque estimating observer. The natural frequency Frq may be determined based on an electric current of the motor instead of the estimated disturbance torque. Further, the natural frequency Frq may be determined based on a velocity of the motor which is detected by a velocity detector provided on the motor.

As described, the natural frequency Frq is determined using an external measuring device or based on an estimated disturbance torque, an electric current or a velocity of the motor for driving the wrist axis. The natural frequencies of the hand 2 holding a workpiece and not holding a workpiece are determined. In the case where a different kind of workpiece is to be handled by the hand 2, each natural frequency of the hand holding a different kind of workpiece is determined. If the measured natural frequencies have different values, the respective natural frequencies are stored in the robot controller to be associated with an operation status of the hand and the kind of workpiece.

The robot controller of the present invention controls the robot so that the end effector does not vibrate in operation of the robot using the determined and stored natural frequency (or the cycle of the natural vibration) of the end effector. Thus, when the robot is to be operated, the natural frequency suitable for the operation status of the end effector designated in the operation program or by an input signal is selected, and parameters for acceleration/deceleration processing are modified based on the selected natural frequency to generate an acceleration/deceleration command for performing the acceleration/deceleration motion.

A first embodiment in which acceleration/deceleration control means for generating acceleration/deceleration commands comprises two filters connected in series for performing linear acceleration/deceleration will be described. A value of a motion command X1 after the linear acceleration/deceleration processing is expressed as the following equation (1), where p represents a filter length (number of resisters), x represents a present motion command, x1, x2, . . . , xp−1 represent motion commands of past (p−1) processing periods, which are distributed from a host computer at every predetermined period.

$$X1 = (x + x1 + x2 +, \ldots, xp-1)/p \tag{1}$$

The motion command X1 as an output of a first filter is inputted to a second acceleration/deceleration processing means to perform two-step linear acceleration/deceleration processing of the acceleration/deceleration control means of this first embodiment.

Figure 11:
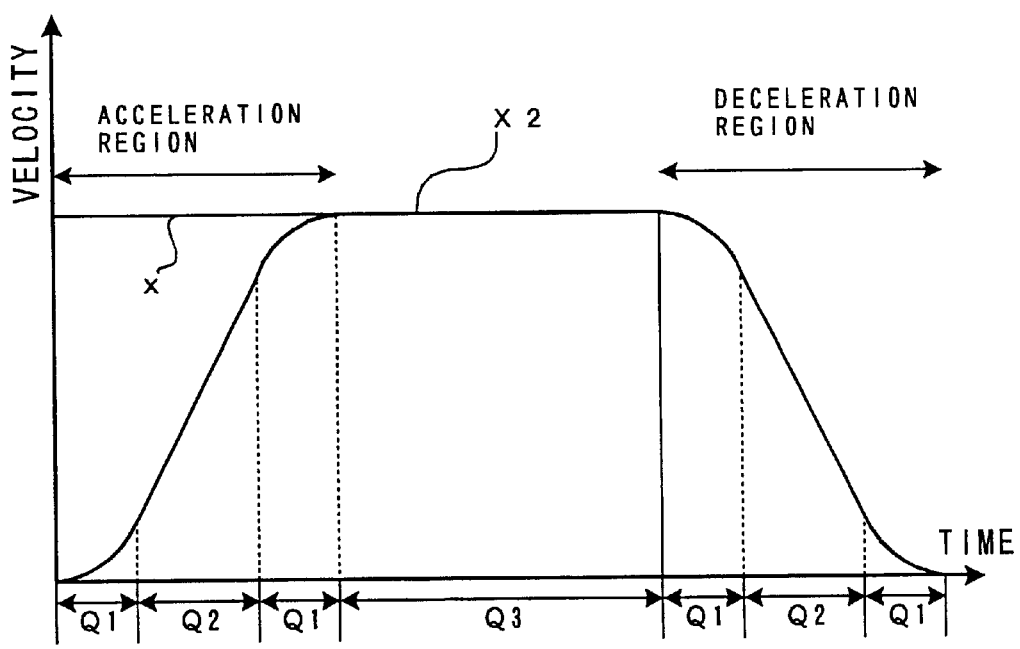
FIG. 11 is a graph showing a velocity command (motion command) after the acceleration/deceleration processing.

FIG. 11 shows relationship between an input and an output of the linear acceleration/deceleration processing means. When the same velocity x (i.e., the motion command at each distribution period) is inputted for a predetermined time (predetermind number of distribution periods), an output X2 of the second acceleration/deceleration processing filter is generated as shown in FIG. 11.

In FIG. 11, the acceleration varies and thus the jerk, i.e. second derivative of the velocity, is not "0" in sections Q1, the acceleration remains constant and the jerk is "0" in sections Q2, and the velocity remains constant and the acceleration and the jerk are "0" in a section Q3.

In the first linear acceleration/deceleration processing, since the motion command x of the same value is inputted at every distribution period, the output of the first linear acceleration/deceleration filter increases by "x/p" according to the equation (1) at the beginning of the processing, i.e., the acceleration is constant. After elapsing p time-periods, the sum of x, x1, x2, . . . , and xp−1 having the same value is divided by p in the equation (1) and thus the output X1 becomes equal to the input x, i.e., the velocity is made constant. The velocity indicated by the output X1 of the first acceleration/deceleration filter increases linearly and then remains constant after elapsing the time period corresponding to the filter length p which represents a time constant.

The second acceleration/deceleration filter, to which the output X1 of the first acceleration/deceleration filter is inputted and having a filter length q, performs acceleration/deceleration processing in the similar manner as the first acceleration/deceleration filter to produce an output X2 shown in FIG. 11. An example of variation of the output X2 is shown in the following table 1, where the filter length p of the first acceleration/deceleration filter is set to "8" and the filter length q of the second acceleration/deceleration filter is set to "4".

TABLE 1

| PERIOD | INPUT X | FIRST OUTPUT X1 | SECOND OUTPUT X2 | ACCEL-ERATION | JERK |
|---|---|---|---|---|---|
| 0 | 0 | 0 | 0 | 0 | 0 |
| 1 | X | X/8 | X/32 | X/32 | X/32 |
| 2 | X | 2X/8 | 3X/32 | 2X/32 | X/32 |
| 3 | X | 3X/8 | 6X/32 | 3X/32 | X/32 |
| 4 | X | 4X/8 | 10X/32 | 4X/32 | X/32 |
| 5 | X | 5X/8 | 14X/32 | 4X/32 | 0 |
| 6 | X | 6X/8 | 18X/32 | 4X/32 | 0 |
| 7 | X | 7X/8 | 22X/32 | 4X/32 | 0 |
| 8 | X | 8X/8 | 26X/32 | 4X/32 | 0 |
| 9 | X | 8X/8 | 29X/32 | 3X/32 | −X/32 |
| 10 | X | 8X/8 | 31X/32 | 2X/32 | −X/32 |
| 11 | X | 8X/8 | 32X/32 | X/32 | −X/32 |
| 12 | X | 8X/8 | 32X/32 | 0 | −X/32 |
| 13 | X | 8X/8 | 32X/32 | 0 | 0 |

As shown in Table 1, the output of the first acceleration/deceleration filter increases at each processing period from the first period to the eighth period, and becomes equal to the input x after the eighth period. The output X2 of the second acceleration/deceleration filter increases until the eleventh processing period. Thus, the output X2 indicates the velocity command since the output X2 designates a motion amount at the predetermined fixed period and thus the variation of the output X2 indicates the acceleration. The acceleration is present until the eleventh processing period and thus the velocity increases, and then the acceleration becomes "0" to output the motion command x. The jerk, which is variation of the acceleration, increases by x/8×4=x/32 at each processing period from the first processing period to the fourth processing period. The jerk becomes "0" from the fifth processing period to the eighth processing period since the acceleration remains constant value of 4x/32=x/8, and decreases by x/3 from the ninth processing period to the twelveth processing period.

Thus, the velocity command (motion command at every processing period) as shown in FIG. 11 is obtained by connecting two linear acceleration/deceleration filters in series. As stated above, in the acceleration/deceleration processing means comprising tow linear acceleration/deceleration filters, the acceleration is determined by the filter length of the first liner acceleration/deceleration processing and the jerk is determined by the filter length of the second linear acceleration/deceleration processing.

The jerk Jmax is expressed in the following equation, where Frq represents the natural frequency, Acc represents acceleration of the robot, and T0 represents a time period in which the acceleration increases form "0" to a predetermined value. The acceleration Acc is optimized in accordance with each motion and different for each motion.

$$Jmax = Acc/T0 \qquad (2)$$

The time period T which is ½ of the natural frequency is calculated according to the following equation (3).

$$T = 1/(2.0 \times Frq) \qquad (3)$$

So as to suppress the vibration, it is necessary for the time period T to meet the following condition with respect to the time period T0.

$$T \geq T0$$

The time period T is set to T0 as a minimum value.

$$T = T0 \qquad (4)$$

The allowable maximum jerk Jmax is calculated according to the following equation based on the equations (2), (3) and (4).

$$Jmax = 2.0 \times Acc \times Frq \qquad (5)$$

The robot can be operated without vibration of the hand or a workpiece by controlling the jerk not to excess the allowable maximum jerk Jmax.

The acceleration/deceleration motion command is modified so that the jerk J in operation which is calculated based on the operation pattern in path planning fulfills the following relationship.

$$J \leq Jmax \qquad (6)$$

As described, the jerk is determined by the filter length of the second linear acceleration/deceleration filter of the two-step acceleration/deceleration processing. J is calculated according to the following equation (7) where q represents the filter length of the second acceleration/deceleration filter, which is equivalent to "p" in the equation (1), and Ts represents the processing period.

$$J = Acc/q \times Ts \qquad (7)$$

From the equations (5), (6) and (7), the relationship below is obtained.

$$Acc/q \times Ts \leq Jmax = 2.0 \times Acc \times Frq$$

Thus, the second filter length q may be set to the minimum value which fulfills the following condition (8).

$$q \geq 1/2.0 \times Frq \times Ts \qquad (8)$$

In order to select an operation mode in accordance with requirements such as a rapid motion permitting a slight vibration and a presice operation with no vibration, the coefficient Fc may be set in accordance with the requirement at every execution of the operation program or set in the program in advance. For this purpose, Frq' may be used as an adjusted natural frequency which is obtained by multiplying the coefficient Fc by the natural frequency Frq.

$$Frq' = Frq \times Fc \qquad (9)$$

With the above setting, degree of suppressing the natural vibration can be minutely set for each motion. In the case where the minute setting is not required, the coefficient Fc is fixedly set to 1.0 and may be changed when the minute setting is required.

Thus, the natural frequency Frq of the end effector is determined in accordance with an operation status of the robot (a kind of end effector, a kind of a workpiece to be handled, whether or not the hand holds a workpiece) as described, and is stored in the memory 102 with a schedule number.

Figure 2:
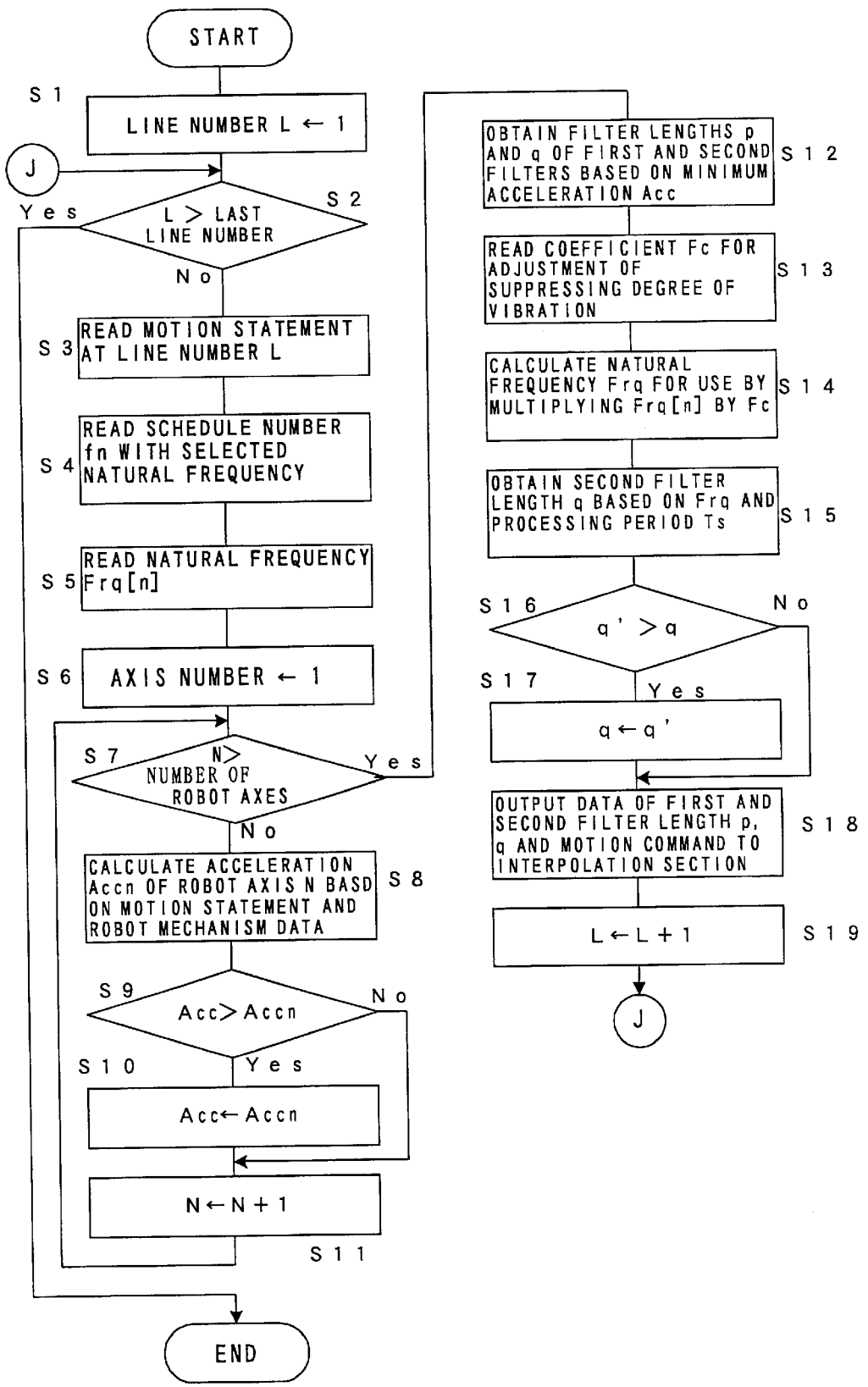
FIG. 2 is a flowchart of processing for obtaining filter lengths of first filter and second filters according to a first embodiment of the present invention.

When the robot operation is started, the main processor 102 starts the processing as shown in FIG. 2. The line number resistor L is set to "1" (Step S1) and it is determined whether the line number L exceeds the last line number of the operation program (Step S2). If the line number L does not exceeds the last line number, a motion statement at the line number L of the operation program is read (Step S3). Then, a schedule number fn is read and the natural frequency Frq[fn] associated with the schedule number fn is read (Step S4). The schedule number fn may be set in the operation program or set directly in the memory 102 so as to be renewed by an external signal.

A register N indicating an axis number is set to "1" (Step S6) and it is determined whether or not the value of the register N exceeds the number of robot axes (Step S7). If the value of the register N does not exceed the number of robot axes, the acceleration Accn of the axis indicated by the register N is calculated based on the motion statement read in Step S3 and information of the robot mechanism (link lengths of the robot arm, etc.) (Step S8). The acceleration Accn is compared with the minimum acceleration Acc stored in a register which is set to the maximum allowable value in the initial setting. If the calculated acceleration Accn is smaller than the minimum acceleration Acc, the calculated acceleration Accn is stored in the register as the minimum acceleration (Step S10). Then, the register is incremented by "1" (Step S11). If the acceleration Accn is not smaller than the minimum acceleration Acc, the procedure proceeds from Step S9 to Step S11. In the above comparison, an absolute value of the calculated acceleration Accn is compared with an absolute value of the minimum acceleration Acc, ignoring the sign of the values.

The procedure returns from Step S11 to Step S7 and the processing from Step S7 to Step S11 is repeatedly executed until the value of the register N exceeds the number of robot axes, to obtain the minimum acceleration Acc.

When the value of the register N exceeds the number of robot axes, the procedure proceeds from Step S7 to Step S12 for obtaining filter lengths p and q of the first and second filters for the two-step acceleration/deceleration processing. The length p of the first filter is obtained by dividing the minimum acceleration Acc by the processing period Ts of the acceleration/deceleration processing.

$$p = Acc/Ts \quad (10)$$

The length q of the second filter is obtained based on a predetermined rate which is set with respect to the filter length p of the first filter in the conventional manner. Thus obtained filter length is represented by q'.

Then, the coefficient Fc set in accordance with a kind of motion, an application of an operation of the robot is read (Step S13). As mentioned, the coefficient Fc may be set in the operation program or stored in the memory 102.

The coefficient Fc is multiplied by the natural frequency Frq[n] to obtain the adjusted natural frequency Frq (Step S14). This calculation is performed according to the equation (9) by substituting Frq for Frq', and Frq[n] for Frq in the equation.

Then, the filter length q of the second filter is determined to be the minimum value fulfilling the condition (8) (Step S15). The filter length q of the second filter obtained in Step S15 is compared with the filter length q' of the second filter obtained in Step S12 (Step S16). If the filter length q' obtained in Step S12 is greater or longer than the filter length q obtained in Step S15, the filter length q' is adopted as the filter length q of the second filet for the acceleration/ deceleration processing for the present motion (Step S17).

The first filter length p calculated in Step S12, the second filter length q determined by the processing of Steps S15–17, and the motion command read in Step S3 are outputted to an interpolation section (Step S18), and the line number register L is incremented by "1" (Step S19), to return to Step S2. Subsequently, the processing of Step S2 and the subsequent Steps is repeatedly executed and when the line number register L exceeds the last line number of the operation program, the procedure of the present operation program is terminated.

The interpolation section performs the acceleration/ deceleration processing before or after the interpolation processing based on the motion command, and the first filter length p and the second filter length q.

Figure 3:
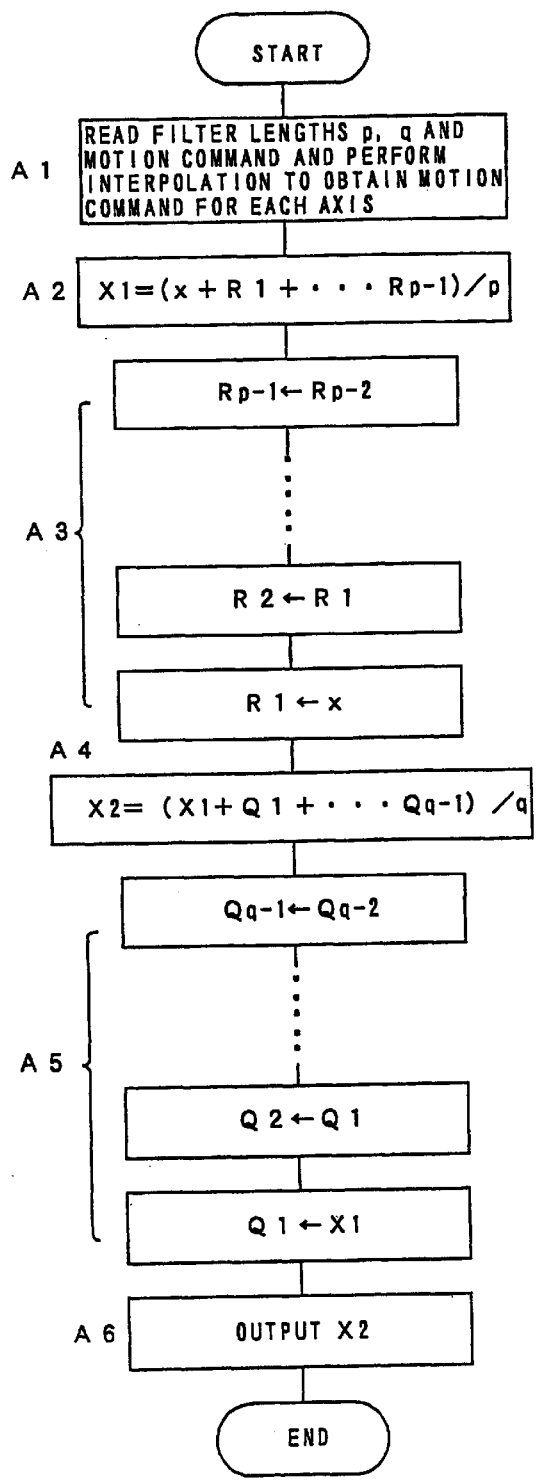
FIG. 3 is a flowchart of acceleration/deceleration processing according to the first embodiment.

A flowchart of FIG. 3 shows the acceleration/deceleration processing after the interpolation. The main processor 101 executes the acceleration/deceleration processing at every predetermined period. First, the filter length p and q of the first and second acceleration/deceleration processing, and the motion command are read, and an interpolation processing is performed based on the read motion command in the conventional manner to obtain motion commands for respective axes (Step A1). The processing of Steps A2–A6 is performed for acceleration/deceleration processing for each axis. The first-step of the acceleration/deceleration processing is performed. The present motion command value x distributed for the axis is added to respective values of registers R1–Rp–1 of the numbers smaller than "p" by 1 and the obtained value is divided by the filter length p (=the number of registers+1) to obtain an output X1 of the first filter (Step A2).

The values of the registers R1–Rp–1 are shifted so that the value of the lower register is stored in the adjacent upper register (Step A3). Specifically, the value of the register Rp–2 is stored in the register Rp–1, the value of the register Rp–3 is stored in the register Rp–2, . . . , the value of the register R1 is stored in the register R2. The present motion command x distributed for the axis is stored in the lowest register R1 to terminate the first filter processing.

A similar processing is performed in the second filter processing with the output x1 of the first filter used as an input of the second filter having the filter length q. The output x1 of the first filter is added to respective values of registers Q1–Qq–1 of the numbers smaller than "q" by 1 and the obtained value is divided by the filter length q (=the number of registers+1) to obtain an output X2 of the second filter (Step A4). The values of the registers Q1–Qq–1 are shifted so that the value of the lower register is stored in the adjacent upper register and the output X1 of the first filter is stored in the lowest register (Step A5). Specifically, the value of the register Qp–2 is stored in the register Qp–1, the value of the register Qp–3 is stored in the register Qp–2, . . . , the value of the register Q1 is stored in the register Q2, and the output X1 of the first filter is stored in the register Q1.

Then, the output X2 of the second filter obtained in Step A4 is outputted to a position loop of the servo controller 105 as an acceleration/deceleration motion command (Step A6).

In the foregoing embodiments, two linear acceleration/ deceleration processing filters are connected in series to form the acceleration/deceleration processing means, so as to obtain an output response in the acceleration/deceleration motion as shown in FIG. 11. An exponential function filter for obtaining a similar acceleration/deceleration output response will be described as a second embodiment.

Figure 12:
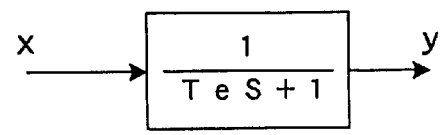
FIG. 12 is a block diagram of a transfer function of an exponential function filter comprising a low-pass filter.

The exponential function filter is expressed by a transfer function as shown in FIG. 12. In FIG. 12, S represents the Laplace operator.

A frequency transfer function is expressed by $1/(j\omega t+1)$, where a cut-off frequency $\omega = 1/T$. Thus, the vibration of an end effector can be suppressed by setting a time constant T to be a cycle Te(=1/Frq) of the natural vibration Frq. A Z-conversion in sampling processing in S region of the Laplace transform is expressed as follows;

$$Z=EXP(-Ts/\delta)$$

where Ts represents a sampling period, δ represents a time constant.

A transfer function in Z region of the exponential function filter shown in FIG. 12 is expressed as follows;

$$y/x=[1-EXP(-Ts/Te)]/[Z-EXP(-Ts/Te)] \quad (11)$$

where x represents an input, y represents an output and T=δ=Te represents a time constant.

The state equation is expressed by the following equation (12) according to the above equation (11) using α=EXP(-Ts/Te)

$$y(n+1)=(1-\alpha)\times x(n)+\alpha \times y(n) \quad (12)$$

In the equation (12), an initial value y(0) is set to "0".
n=0: input x(0)=0; output y(1)=0,
n=1: input x(1); output y(2)=(1-α)×x(1)+α×y(1)
n=2: input x(2); output y(3)=(1-α)×x(2)+α×y(2)
•
•
•
n=N: input x(3); output y(N+1)=(1-α)×x(N)+α×y(N)

Thus, the output y(n) is obtained in the predetermined processing period according to the equation (12) using the input x(n-1) and the output y(n-1) in the immediately preceding processing period with an adjusted parameter of the time constant Te, so that the acceleration/deceleration processing by the exponential function filter is performed.

In this second embodiment where the exponential function filter is employed as the acceleration/deceleration filter, the main processor 101 performs the processing of Steps S1–S5 and skips the processing of Steps S6–S12 and S15–17, and performs the processing of Steps S13 and S14 to obtain the natural frequency Frq in the flowchart of FIG. 2. Then, the procedure proceeds to Step S18 where the time constant T of the filter is obtained as T =Te=1/Frq using the determined natural frequency Frq, and thus obtained time constant Te and the motion command read in Step S3 are inputted. Then, the register L is incremented by "1" (Step S19) and the procedure returns to Step S2.

Figure 4:
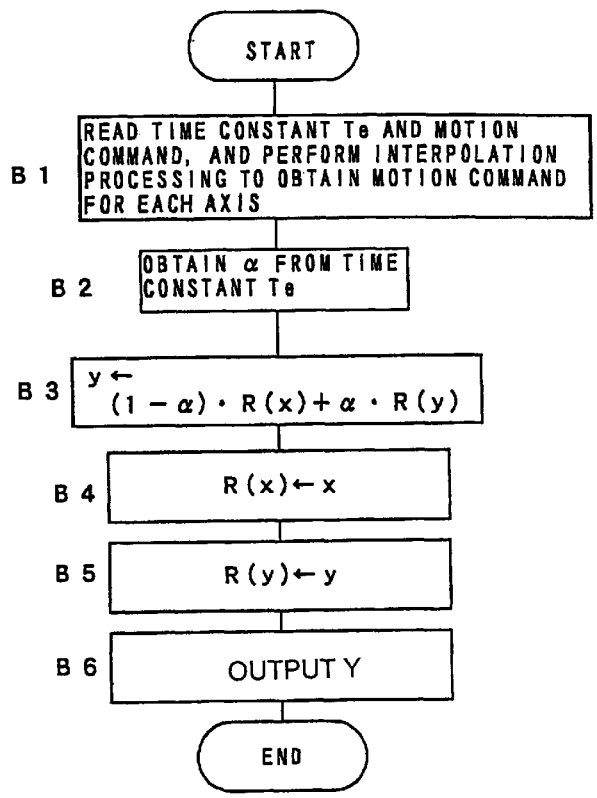
FIG. 4 is a flowchart of acceleration/deceleration processing according to a second embodiment of the present invention.

In this embodiment, the interpolation processing shown in FIG. 4 is performed at every predetermined processing period Ts.

First, the time constant Te and the motion command are read to perform the interpolation processing in the conventional manner to obtain a motion command x value for distribution to each axis in the present processing period Ts (Step B1). The constant a is obtained according to the equation α=EXP(-Ts/Te) (Step B2). Then, the operation of the equation (12) is performed using the motion command x of the immediately preceding period and the output y obtained in the immediately preceding period to obtain the output y of the present processing period (Step B3). The motion command x of the present period is stored in the register R(x) and the obtained output y is stored in the register R(y) (Step B4, B5), and then the motion command y subjected to the acceleration/deceleration processing by the exponential function filter at Step B3 is outputted to the position loop of the servo controller 105.

As described, vibration of the end effector such as a robot hand with or without a workpiece can be suppressed using the exponential function filter as the acceleration/deceleration means by adjusting the time constant of the filter in accordance with a cycle of the natural vibration of the end effector.

The acceleration/deceleration processing means using a band rejection filter using a low-pass filter and a high-pass filter to cut off frequencies of a specific band will be described as a third embodiment.

Figure 13:
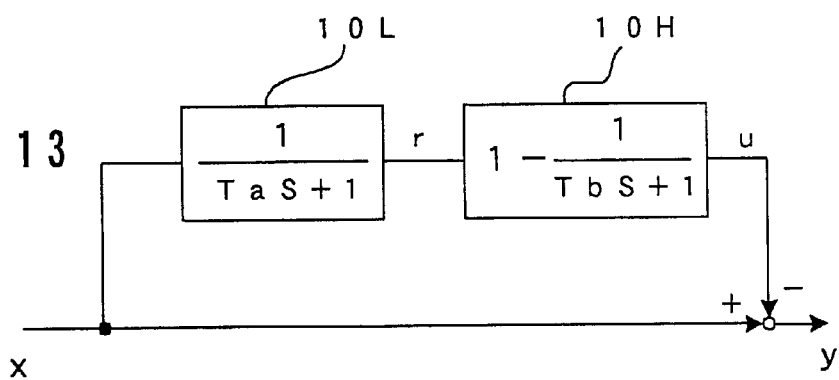
FIG. 13 is a block diagram of transfer function of acceleration/deceleration processing means comprising a band rejection filter.

FIG. 13 shows a transfer function of the band rejection filter having a low-pass filter and a high-pass filter to cut off frequencies of a specified band. First, a frequency component of the input x equal to or higher than a predetermined frequency Fa is cut off by the low-pass filter 10L to obtain an output r. Ta represents a time constant for cutting off the frequency equal to or higher than the predetermined frequency Fa. A frequency component of the output r equal to or lower than a predetermined frequency Fb is cut off by the high-pass filter 10H to obtain an output u. Tb represents a time constant for cutting off the frequency equal to or lower than the predetermined frequency Fb. Thus, the output u of only the frequency of the band between the predetermined frequencies Fa and Fb is obtained. The output u is subtracted form the input x to obtain an output in which the frequency between the predetermined frequencies Fa and Fb is cut off, thus constituting the band rejection filter.

The state equation of the low-pass filter 10L will be described. Since the low-pass filter 10L is the same as the exponential function filter as described with respect to the second embodiment, the time constant T in the equation (11) is set as T=α=Ta.

$$r/x=[1-EXP(-Ts/Ra)]/[Z-EXP(-Ts/Ta)]$$

The state equation is expressed as follows;

$$r(n+1)=(1-\alpha)\times x(n)+\alpha \times r(n) \quad (13)$$

where $$\alpha=EXP(-Ts/Te)$$

The state equation of the high-pass filter 10H will be described. A transfer function of the high-pass filter 10H is expressed as follows;

$$u/r=1-[1/(Tbs+1)] \quad (14)$$

where S is Laplace operant.
In the equation (14), an intermediate variable v is set as follows;

$$v=r/(TbS+1) \quad (15)$$

From the equation (15), the following equation is obtained.

$$v/r=1/(TbS+1) \quad (16)$$

Since the equation (16) has the same form as the foregoing exponential function filter, a transfer function of the equation (16) in Z region is expressed as follows;

$$v/r=[1-EXP(-Ts/Tb)]/[Z-EXP(-Ts/Th)] \quad (17)$$

In the equation (17), the following equation is obtained in the same manner as the equation (13) using $\beta=\text{EXP}(-Ts/Ta)$.

$$V(n+1)=(1-\beta)\times r(n)+\beta\times v(n) \quad (18)$$

Thus, the output u(n+1) of the high-pass filter is expressed by the following equation according to the equation (14) using r(n+1) obtained by the equation (13) and v(n+1) obtained by the equation (18).

$$u(n+1)=r(n+1)-v(n+1) \quad (19)$$

The output y of the band rejection filter is obtained by subtracting the output u of the high-pass filter 10H from the input x, as follows;

$$y(n+1)=x(n+1)-u(n+1) \quad (20)$$

Thus, the following equation (21) is obtained form the equations (19) and (20).

$$y(n+1)=x(n+1)-r(n+1)+v(n+1) \quad (21)$$

The vibration suppressing processing can be performed by obtaining the output y(n+1) as a command for the motor according to the equations (13), (18) and (21), using initial values x(0)=0, r(0)=0, v(0)=0.

In this third embodiment, the main processor 101 performs the processing of Steps S1–S5 and skips the processing of Steps S6–S12 and S15–S17, and performs the processing of Steps S13 and S14 to obtain the natural frequency Frq in the flowchart of FIG. 2. Then, a predetermined band width H is added to and subtracted form the natural frequency Frq, to obtain an lower limit frequency Fa of the low-pass filter and an upper limit frequency Fb of the high-pass filter, and the time constants Ta and Tb are obtained as reciprocal numbers of the frequencies Fa and Fb, respectively.

$$Ta=1/Fa=1/(Frq+H)$$

$$Tb=1/Fb=1(Frq-H)$$

Thus obtained time constants Ta and Th and the motion command read in Step S3 are outputted to the interpolation section and the procedure proceeds to Step S2 after executing the processing of Step S19.

Figure 5:
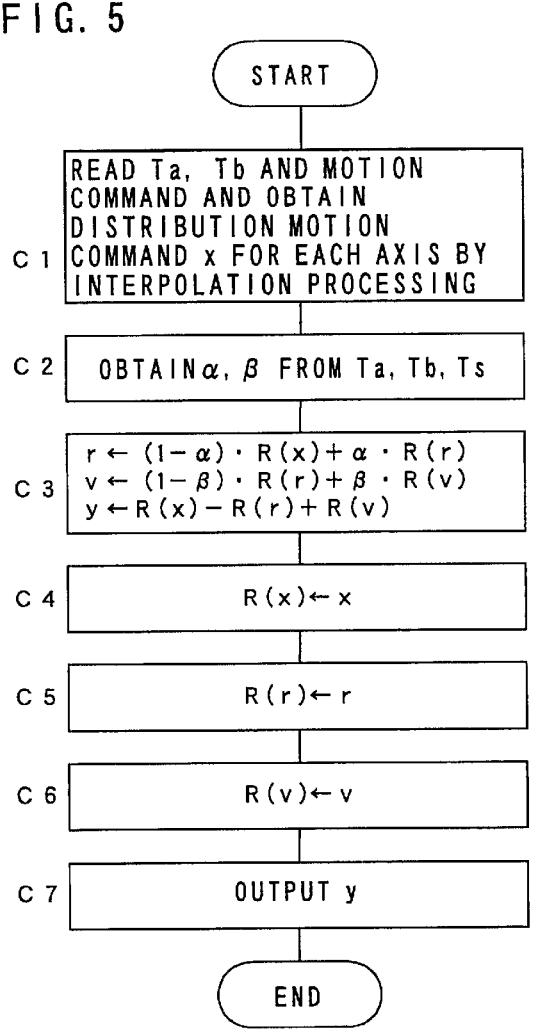
FIG. 5 is a flowchart of acceleration/deceleration processing according to a third embodiment of the present invention.

FIG. 5 shows processing to be performed by the interpolation processing section in the third embodiment at every predetermined period.

First, the time constants Ta ad Th as parameters of the acceleration/deceleration processing and the motion command are read, the motion command is subjected to the interpolation processing in the conventional manner to obtain a motion command x for distribution to the axis at the present period is obtained (Step C1). Then, values of α and β are obtained as α=EXP(−Ts/Ta), β=EXP(−Ts/Th) from the read time constants and the cycle Ts of the processing (Step C2). A motion command y having subjected to the acceleration/deceleration processing at every interpolating period is obtained by the processing of Step C3 and the subsequent Steps for each axis.

In Step C3, an output r of the low-pass filter of the present processing period is obtained according to the equation (13) using the distribution motion command x and the output r of the immediately preceding period stored in the registers R(x) and R(r), and the value of α obtained in Step C2. The intermediate variable v for the present processing period is obtained according to the equation (18) using the output r of the low-pass filter and the intermediate variable v of the immediately preceding period stored in the registers R(r) and R(v), and the value of P obtained in Step C2. The distribution motion command y of the present processing period, which has been subjected to the acceleration/deceleration processing (processing of the band rejection filter) is obtained according to the equation (19) using the distribution motion command x, the output r of the low-pass filter and the intermediate variable v of the immediately preceding period.

Then, the distribution motion command of the present period for each axis read in Step C1 is stored in the register R(x), and the output r of the low-pass filter and the intermediate variable v obtained in Step C3 are stored in the registers R(r) and R(v) (Steps C4, CS and C6). The motion command y after the acceleration/deceleration processing (by the band rejection filter) obtained in Step C3 is outputted to the position loop of the servo controller 105.

In the foregoing embodiments, the natural frequencies of the end effectors with and/or without the workpiece are stored and the parameters of the acceleration/deceleration processing are determined based on the stored natural frequencies for operating the robot not to generate the vibration. Alternatively, the cycles of the natural vibrations of the end effectors with and/or without the workpiece are stored and the parameters of the acceleration/deceleration processing are determined based on the stored cycles of the natural vibrations.

Further, in the foregoing embodiments, the acceleration/deceleration filter is arranged before the position loop of the servo controller. Alternatively, the acceleration/deceleration filter may be arranged after the velocity loop so that a torque command (current command) outputted from the velocity loop is subjected to the processing of the acceleration/deceleration filter and then send to the current loop.

The foregoing embodiments are described with respect to a controller for a robot for suppressing a vibration of an end effector attached to a robot. The present invention can be generally applied to an industrial machine such as a robot, a machine tool and a manufacturing machine having an electric motor as a driving source of the machine, so as to suppress vibration of the machine itself, an attachment attached to the machine and the machine with the attachment, as a controlled system.

Hereinafter described is another embodiment of the present invention having a function of suppressing the vibration of the industrial machine such as a machine tool and a manufacturing machine. A filter for suppressing the vibration of the machine is provided to receive a torque command from the velocity loop, as shown in FIG. 14.

As stated, the natural frequency of the machine varies with variation of a load, dispersion in manufacturing of the machine, variation of environment in use and aging of the machine, to lower the vibration suppressing function of the filter. According to the present invention, coefficients of the filter is altered in accordance with the variation of the natural frequency to improve the vibration suppressing function.

Figure 14:
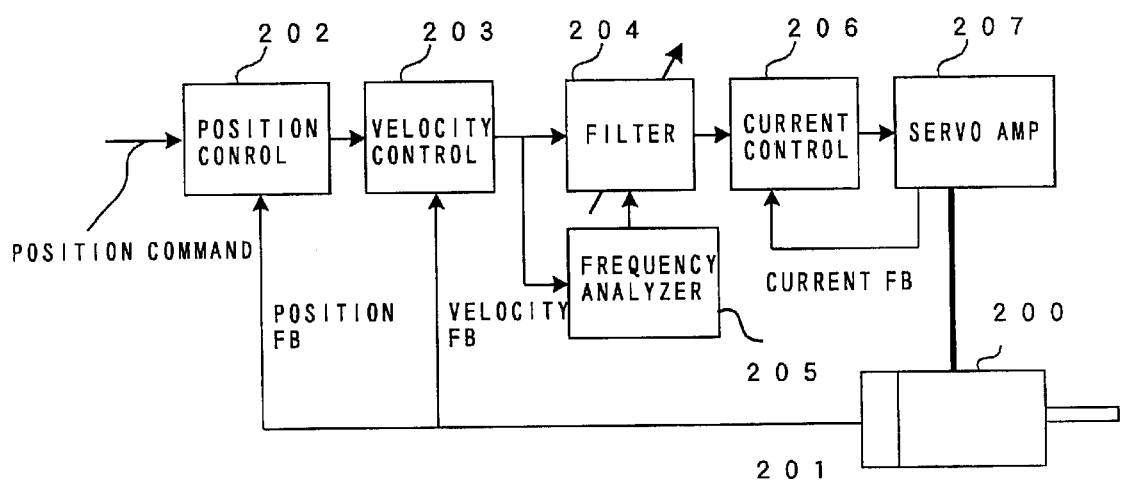
FIG. 14 is a block diagram of a control system for a servomotor for driving a mechanism of a machine.

FIG. 14 is a block diagram of a control system (including a psotion control section, a velocity control section and a current control section) of an electric motor for driving a movable mechanism of an industrial machine of a robot, a machine tool such as a machining center, a lathe, an electric discharge machine, a laser machine, and a manufacturing machine such as an injection molding machine, a press machine, a conveying machine and a winding machine, as a controlled system. The position control section 202 performs a velocity loop control based on a position command from a host computer such as a numerical controller (NC) and a position feedback signal from a position/velocity detector 201 such as a pulse coder for detecting a position and a velocity of a servomotor 200, to output a velocity command. The velocity control section 203 performs a velocity control based on a velocity command form the position control section 202 and a velocity feedback signal form the position/velocity detector 201, to output a torque command. The torque command is subjected to filtering processing by a filter 204 and then inputted to the current control section 206. The filter 204 employed in this embodiment is a band rejection filter as shown in FIG. 13. Coefficient (time constants Ta, Th) of the filter 204 are automatically altered in conformity with the natural frequency obtained by analysis by a frequency analyzer 205, to cope with the variation of the natural frequency.

The current control section 206 performs a current control based on the torque command and a current feedback signal from a current detector (not shown) for driving a servomotor 200 through a servo amplifier 207.

The position, velocity and current control sections perform the position-loop, velocity-loop and current-loop processing, respectively in the conventional manner except that the coefficients of the filter are altered in accordance with the natural frequency analyzed by the frequency analyzer 205. The processing of the filter 204 is performed by a processor which performs the above position-loop, velocity-loop and current-loop processing.

According to this embodiment, the frequency analyzer 205 is provided to receive a control signal regarding position, velocity or current of the servomotor 200, and the coefficients of the filter 204 are automatically altered in accordance with variations of the natural frequency of the machine to suppress the vibration.

Figure 15:
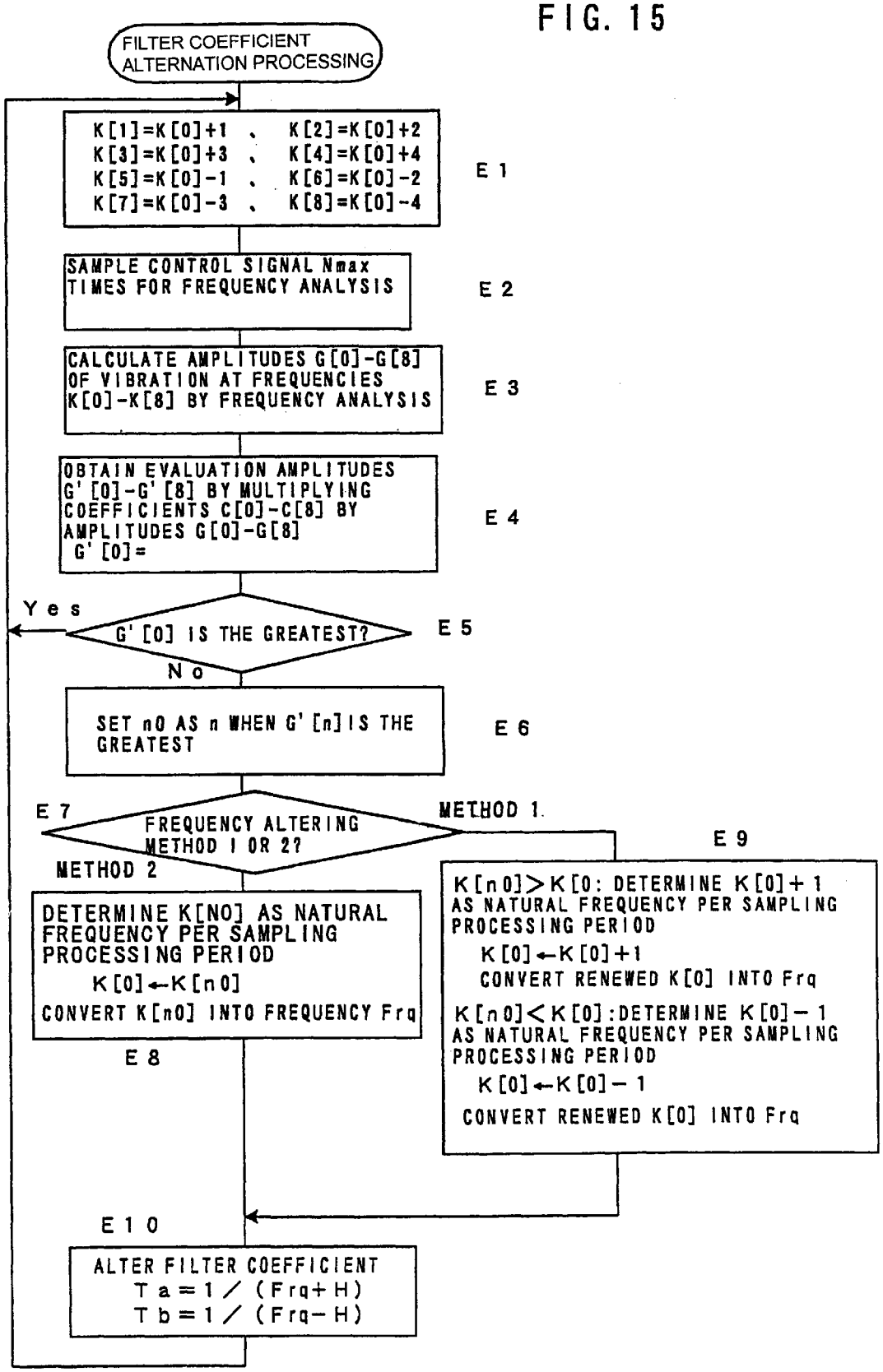
FIG. 15 is a flowchart of filter coefficient altering processing according to another embodiment of the present invention.

FIG. 15 shows the filter coefficient alternation processing to be performed by the processor in the servo control system.

First, a central frequency of the band rejection filter 204 used in the control system is converted to a frequency per a sampling processing period during which sampling processing of a control signal is performed, and set to a register as a frequency K[0] per the sampling processing period, on a stage of manufacturing the machine. The central frequency of the band rejection filter 204 is initially set to coincide with a natural frequency of the machine at the manufacturing of the machine and thus the frequency K[0] indicates a frequency per the sampling processing period, which represents a natural frequency of the machine in the manufacturing.

In an operation of the machine, the processor of the control system executes the processing as shown in FIG. 15 at every predetermined period to automatically alter the coefficients of the filter 204 in accordance with variations of the natural frequency of the machine.

First, frequencies K[1]–K[4] are obtained by adding "1", "2", "3" and "4", respectively, to the frequency K[0] and stored in registers, and frequencies K[5]–K[8] are obtained by subtracting "1", "2", "3" and "4", respectively, from the frequency K[0] (Step E1).

Then, a control signal is sampled Nmax times in the sampling processing period (Step E2). The sampling processing period "TS" is expressed by TS=ts×Nmax where "ts" represents a sampling period. The control signal of a torque command outputted from the velocity control section 203 is sampled in this example. However, the control signal to be sampled may be one of the velocity command from the position control section or the position feedback signal, the torque command (current command) from the velocity control section or the velocity feedback signal, and a current feedback signal so as to determine the natural frequency.

Vibration amplitutes G[0]–G[8] of the sampled control signal at the frequency K[0]–K[8] are obtained through the frequency analysis well known in the art (Step E3). Then, vibration amplitutes G[0]–G[8] are multiplied by predetermined evaluation coefficients C[0]–C[8], respectively, to obtain evaluation vibration amplitutes G'[0]–G'[8] (Step E4). The evaluation coefficients C[0]–C[8] are fixed values not less than "0".

G'[n]=C[n]×G[n], where "n" is an integer from 0 to 8.

Then, the evaluation vibration amplitude G'[0] is compared with the other evaluation vibration amplitutes G'[1]–G'[8] to determine whether or not the magnitude G'[0] is the greatest in the magnitudes G'[0]–G'[8] (Step E5). If the magnitude G'[0] is the greatest, the coefficients of the band rejection filter 204 is not altered and the procedure returns to Step E1 to repeat the processing of Steps E1–E5.

If the magnitude G'[0] is not the greatest, the procedure proceeds to Step E6 to determine "n" by which the evaluation vibration amplitude G'[n] is the greatest and the determined "n" is set as "n0". Then, it is determined which central frequency altering method is to be adopted (Step E7). If a first central frequency altering method is to be adopted, the vibration frequency K[n0] is determined to be a natural frequency of the machine in terms of frequency per sampling processing period and the vibration frequency K[0] representing the natural frequency of the machine is renewed to be the frequency K[n0]. Then, the renewed vibration frequency K[0] is converted into the frequency Frq and the converted frequency is set to the central frequency of the band rejection filter 204 (Step E8). The coefficients (time constants) Ta and Th are obtained according to the following equations as described, and renewed (Step E10).

$$Ta=1/(Frq+H)$$

$$Th=1/(Frq-H)$$

In the above equations the set value H defines a half of the band to be cut off, and thus the machine is driven by the torque command with a band 2H expanding around the central frequency Frq cut off.

If a second central frequency altering method is to be adopted, the procedure proceeds to Step E9. In Step E9, if the K[n0] is greater than the frequency K[0], the frequency K[0] is renewed to be the frequency K[0], i.e., the frequency K[0] is incremented by "1", and the renewed frequency K[0] is converted into the frequency Frq to be uses as the central frequency of the band rejection filter. If the K[n0] is smaller than the frequency K[0], the frequency K[0] is renewed to be the frequency K[5], i.e., the frequency K[0] is decreased by "1", and the renewed frequency K[0] is converted into the frequency Frq as the central frequency of the band rejection filter. Then, the coefficients Ta and Th are obtained and renewed based on the frequency Frq (Step E10). Subsequently, the procedure returns to Step E1 to execute the processing of Step E1 and the subsequent Steps.

The above described is the processing of automatically altering the coefficients of the filter provided in the control system for suppressing the natural vibration of the machine.

Figure 16:
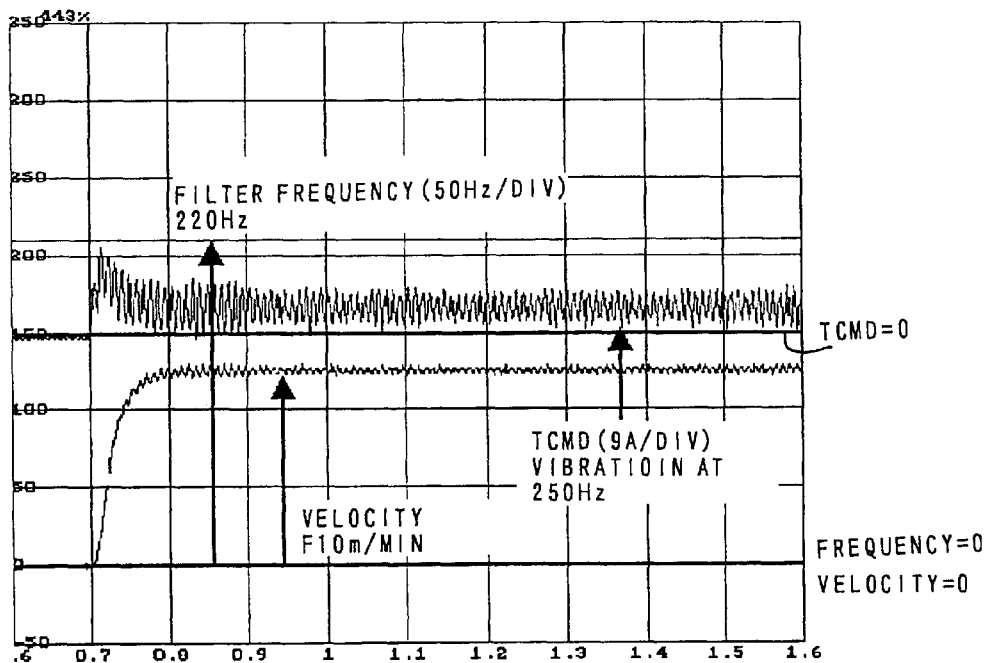
FIG. 16 is a graph showing a measurement result of a torque command when the filter coefficient altering processing is not applied, in a condition where a central frequency of the band rejection filter is 220 Hz and the natural frequency of the machine has been changed to 250 Hz.
Figure 17:
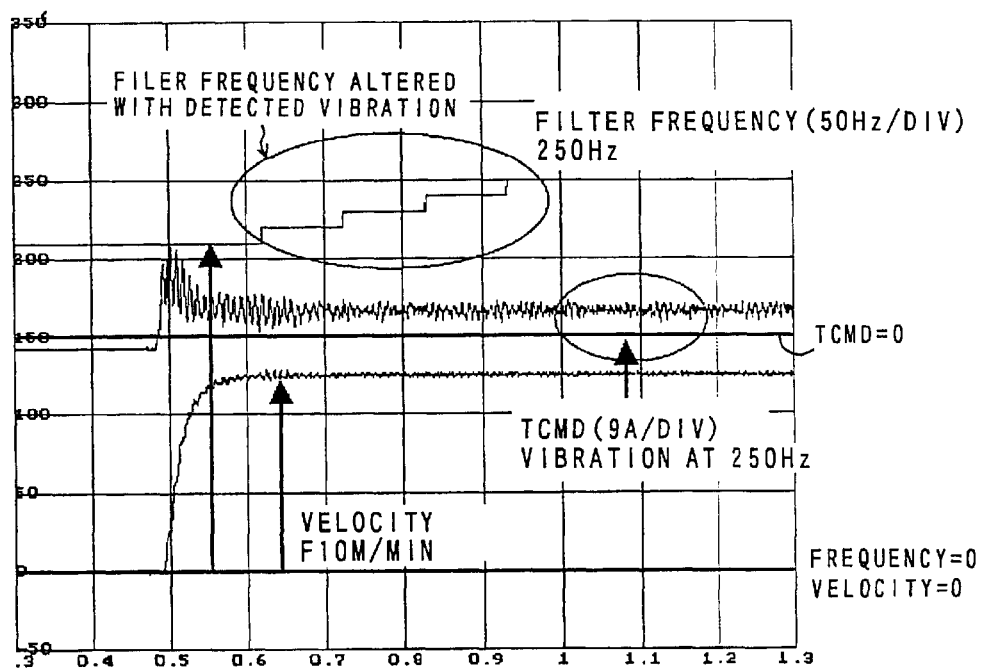
FIG. 17 is a graph showing a measurement result of a torque command when the filter coefficient altering processing is applied, in a condition where the central frequency of the band rejection filter is 220 Hz and the natural frequency of the machine has been changed to 250 Hz.

FIGS. 16 and 17 show variation of the control signal (torque command Tcmd) with the above-described natural frequency altering function ON and OFF, respectively, in a case where the natural frequency of the machine is changed to 250 Hz and the central frequency of the band rejection filter is set to 220 Hz. FIG. 17 shows variation of the control signal with the natural frequency automatic altering function ON according to the second central frequency altering method. As can be seen from comparison of FIGS. 16 and 17, the vibration amplitude of the control signal (torque command TCMD) is reduced when the natural frequency automatic altering function is ON.

In this embodiment, the band rejection filter 204 is adopted as the filter for suppressing the vibration. Alternatively, only a low-pass filter may be adopted since the natural frequency of the machine is relatively high. In this case, the coefficient of the low-pass filter is altered in accordance with variation of the natural frequency of the machine in the similar manner.

Further, in this embodiment, the filter 204 is arranged before the current control section 206 to receive the torque command (current command) from the velocity control section 203 as shown in FIG. 14. Alternatively, the filter 204 may be arranged before the velocity control section 203 to receive a velocity command from the position control section 202 to reduce the amplitude of the natural vibration.

In general, since an attachment to the machine such as an end effector has a natural frequency lower than that of the machine itself, it is effective to arrange the filter to receive the position command for reducing the natural vibration of the end effector and it is effective to arrange the filter to receive the torque command (current command) for reducing the natural vibration of the machine itself.

According to the present invention, vibration of an end effector of a robot is suppressed to perform a robot operation effectively and safely.

Further, a motion command is generated so as to suppress the natural vibration of the movable part of the machine even if the natural vibration varies in accordance with variation of load, dispersion in manufacturing of the machine, environment in use and aging of the machine.

What is claimed is:

1. A controller for a machine having an electric motor as a driving source of the machine, said controller comprising:
   a natural frequency determining unit determining a frequency or a cycle of a natural vibration of the machine and/or an attachment attached to the machine as a controlled system; and
   a motion command generating unit generating a motion command for the electric motor such that the natural vibration of the machine and/or the natural vibration of the attachment is suppressed in accordance with the frequency or the cycle of the natural vibration determined by said natural frequency determining unit,
   wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed,
   wherein said end effector comprises a hand, and said natural frequency determining unit stores data of frequencies or cycles of the natural vibrations of the hand without holding any workpiece and holding a different kind of workpiece, and data of frequency or cycle of the natural vibration of the hand is selected in said data in accordance with holding status of the hand and a kind of workpiece held by the hand.

2. A controller for a machine having an electric motor as a driving source of the machine, said controller comprising:
   a natural frequency determining unit determining a frequency or a cycle of a natural vibration of the machine or an attachment attached to the machine as a controlled system; and
   a motion command generating unit generating a motion command for the electric motor such that the natural vibration of the machine or the natural vibration of the attachment is suppressed in accordance with the frequency or the cycle of the natural vibration determined by said natural frequency determining unit,
   wherein said natural frequency determining unit comprises a frequency analyzer for analyzing a vibration frequency of a control signal for the electric motor to determine the frequency or the cycle of the natural vibration, and said motion command generating unit has a filter for reducing an amplitude of the natural vibration and automatically alters a coefficient of said filter in accordance with the frequency or the cycle of the natural vibration determined by said frequency analyzer.

3. A controller according to claim 2, wherein said filter comprises a low-pass filter.

4. A controller according to claim 2, wherein said filter comprises a band rejection filter.

5. A controller according to claim 2, wherein said frequency analyzer analyzes the control signal regarding a torque of the electric motor.

6. A controller according to claim 2, wherein said frequency analyzer analyzes the control signal regarding a velocity of the electric motor.

7. A controller according to claim 2, wherein said frequency analyzer analyzes the control signal regarding a position of the electric motor.

8. A controller according to claim 2, wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed.

9. A controller according to claim 8, wherein a parameter of said acceleration/deceleration processing section is altered based on the frequency or cycle of the natural vibration of the end effector.

10. A controller according to claim 9, wherein said acceleration/deceleration processing section comprises first and second filters connected in series for performing linear acceleration/deceleration processing, and a filter length of the second filter is determined based on the frequency or the cycle of the natural vibration.

11. A controller according to claim 9, wherein said acceleration/deceleration processing section comprises an exponential function filter having a low-pass filter, and a cutoff frequency of said exponential function filter is determined based on the frequency or cycle of the natural vibration.

12. A controller according to claim 9, wherein said acceleration/deceleration processing section comprises a band rejection filter for rejecting a predetermined band including the frequency of the natural vibration.

13. A controller according to claim 8, wherein a jerk contained in the acceleration/deceleration motion command is limited below an upper limit value determined based on the frequency or the cycle of the natural vibration.

14. A controller according to claim 8, wherein said end effector comprises one of a hand, a gun and a torch.

15. A controller according to claim 8, wherein said end effector comprises a hand, and said natural frequency determining means determines the frequencies or cycles of the natural vibrations of said hand holding a workpiece and holding no workpiece, and said acceleration/deceleration processing section creates the accelerations/deceleration motion command such that the natural vibration of the hand with or without the workpiece is suppressed in accordance with holding status of the hand and the frequencies or the cycles of the natural vibrations determined by said natural frequency determining unit.

16. A controller according to claim 8, wherein said natural frequency determining unit stores data of frequencies or cycles of the natural vibrations of different kinds of end effectors, and data of frequencies or cycles of the natural vibrations is selected in said data in accordance with a kind of the end effector attached to the robot.

17. A controller according to claim 8, wherein said end effector comprises a hand and said natural frequency determining means stores data of each frequency or cycle of the natural vibration of the hand holding a different kind of workpiece and data of frequency or cycle of the natural vibration of the hand is selected in said data in accordance with a kind of workpiece held by the hand.

18. A controller according to claim 8, wherein said end effector comprises a hand, and said natural frequency determining means stores data of frequencies or cycles of the natural vibrations of the hand without holding any workpiece and holding a different kind of workpiece, and data of frequency or cycle of the natural vibration of the hand is selected in said data in accordance with holding status of the hand and a kind of workpiece held by the hand.

19. A controller according to claim 8, wherein a degree of suppression of the natural vibration by said acceleration/deceleration processing section is variably set.

20. A controller according to claim 8, wherein said natural frequency determining unit determines the frequency or cycle of the natural vibration based on a torque or a velocity of the electric motor in the robot when an external force is applied to the end effector.

21. A controller for a machine having an electric motor as a driving source of the machine, said controller comprising:
a natural frequency determining unit determining a frequency or a cycle of a natural vibration of the machine and/or an attachment attached to the machine as a controlled system; and
a motion command generating unit generating a motion command for the electric motor such that the natural vibration of the machine and/or the natural vibration of the attachment is suppressed in accordance with the frequency or the cycle of the natural vibration determined by said natural frequency determining unit,
wherein said machine comprises a robot with an end attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed,
wherein a parameter of said acceleration/deceleration processing section is altered based on the frequency or cycle of the natural vibration of the end effector,
wherein said acceleration/deceleration processing section comprises first and second filters connected in series for performing linear acceleration/deceleration processing, and a filter length of the second filter is determined based on the frequency or the cycle of the natural vibration.

22. A controller for a machine having an electric motor as a driving source of the machine, said controller comprising:
a natural frequency determining unit determining a frequency or a cycle of a natural vibration of the machine and/or an attachment attached to the machine as a controlled system; and
a motion command generating unit generating a motion command for the electric motor such that the natural vibration of the machine and/or the natural vibration of the attachment is suppressed in accordance with the frequency or the cycle of the natural vibration determined by said natural frequency determining unit,
wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed,
wherein a parameter of said acceleration/deceleration processing section is altered based on the frequency or cycle of the natural vibration of the end effector,
wherein said acceleration/deceleration processing section comprises an exponential function filter having a low-pass filter, and a cut-off frequency of said exponential function filter is determined based on the frequency or cycle of the natural vibration.

23. A controller for a machine having an electric motor as a driving source of the machine, said controller comprising:
a natural frequency determining unit determining a frequency or a cycle of a natural vibration of the machine and/or an attachment attached to the machine as a controlled system; and
a motion command generating unit generating a motion command for the electric motor such that the natural vibration of the machine and/or the natural vibration of the attachment is suppressed in accordance with the frequency or the cycle of the natural vibration determined by said natural frequency determining unit,
wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed,
wherein a parameter of said acceleration/deceleration processing section is altered based on the frequency or cycle of the natural vibration of the end effector,
wherein said acceleration/deceleration processing section comprises a band rejection filter for rejecting a predetermined band including the frequency of the natural vibration.

24. A controller for a machine having an electric motor as a driving source of the machine, said controller comprising:

a natural frequency determining unit determining a frequency or a cycle of a natural vibration of the machine and/or an attachment attached to the machine as a controlled system; and a motion command generating unit generating a motion command for the electric motor such that the natural vibration of the machine and/or the natural vibration of the attachment is suppressed in accordance with the frequency or the cycle of the natural vibration determined by said natural frequency determining unit, wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed, wherein a jerk contained in the acceleration/deceleration motion command is limited below an upper limit value determined based on the frequency or the cycle of the natural vibration.

25. A controller for a machine having an electric motor as a driving source of the machine, said controller comprising:

a natural frequency determining unit determining a frequency or a cycle of a natural vibration of the machine and/or an attachment attached to the machine as a controlled system; and a motion command generating unit generating a motion command for the electric motor such that the natural vibration of the machine and/or the natural vibration of the attachment is suppressed in accordance with the frequency or the cycle of the natural vibration determined by said natural frequency determining unit, wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration and the end effector such that the natural vibration of the end effector is suppressed, wherein said end effector comprises a hand, and said natural frequency determining unit determines the frequencies or cycles of the natural vibrations of said hand holding a workpiece and holding no workpiece, and said acceleration/deceleration processing section creates the acceleration/deceleration motion command such that the natural vibration of the hand with or without the workpiece is suppressed in accordance with holding status of the hand and the frequencies or the cycles of the natural vibrations determined by said natural frequency determining unit.

26. A controller for a machine having an electric motor as a driving source of the machine, said controller comprising:

a natural frequency determining unit determining a frequency or a cycle of a natural vibration of the machine and/or attachment attached to the machine as a controlled system; and a motion command generating unit generating a motion command for the electric motor such that the natural vibration of the machine and/or the natural vibration of the attachment is suppressed in accordance with the frequency or the cycle of the natural vibration determined by said natural frequency determining unit, wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed, wherein said natural frequency determining unit stores data of frequencies or cycles of the natural vibrations of different kinds of end effectors, and data of frequencies or cycles of the natural vibrations is selected in said data in accordance with a kind of the end effector attached to the robot.

27. A controller for a machine having an electric motor as a driving source of the machine, said controller comprising:

a natural frequency determining unit determining a frequency or a cycle of a natural vibration of the machine and/or an attachment attached to the machine as a controlled system; and a motion command generating unit generating a motion command for the electric motor such that the natural vibration of the machine and/or the natural vibration of the attachment is suppressed in accordance with the frequency or the cycle of the natural vibration determined by said natural frequency determining unit, wherein said machine comprises a robot with an end effector attached thereto as said attachment, and said motion command generating unit has an acceleration/deceleration processing section for creating an acceleration/deceleration motion command for operating said robot in accordance with the frequency or the cycle of the natural vibration of the end effector such that the natural vibration of the end effector is suppressed, wherein said end effector comprises a hand and said natural frequency determining unit stores data of each frequency or cycle of the natural vibration of the hand holding a different kind of workpiece and data of frequency or cycle of the natural vibration of the hand is selected in said data in accordance with a kind of workpiece held by the hand.

* * * * *